United States Patent
Shivalingaiah et al.

(10) Patent No.: US 12,033,634 B1
(45) Date of Patent: *Jul. 9, 2024

(54) DISAMBIGUATING CONTACTS USING RELATIONSHIP DATA

(71) Applicant: Amazon Technologies, Inc., Seattle, WA (US)

(72) Inventors: Inchara Shivalingaiah, Seattle, WA (US); Milo Oostergo, Eemnes (NL); Gary Zhong, Seattle, WA (US); Aakarsh Nair, Lynnwood, CA (US); Sushant Bhatia, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,025

(22) Filed: Mar. 24, 2023

Related U.S. Application Data

(63) Continuation of application No. 16/588,790, filed on Sep. 30, 2019, now Pat. No. 11,615,790.

(51) Int. Cl.
    *G10L 15/22* (2006.01)
    *G06F 9/54* (2006.01)
    (Continued)

(52) U.S. Cl.
    CPC ............... *G10L 15/22* (2013.01); *G06F 9/54* (2013.01); *G06F 16/9024* (2019.01);
    (Continued)

(58) Field of Classification Search
    USPC ............... 704/246, 247, 251, 252, 257, 275
    See application file for complete search history.

(56) References Cited

U.S. PATENT DOCUMENTS

| 7,505,568 B2 * | 3/2009 | Simpson ............... G06Q 10/087 379/88.01 |
| 2007/0198267 A1 | 8/2007 | Jones et al. |

(Continued)

OTHER PUBLICATIONS

Office Action for U.S. Appl. No. 16/588,790, dated Aug. 2, 2022, Inventor Shivalingaiah, "Disambiguating Contacts Using Relationship Data", 18 pages.

(Continued)

*Primary Examiner* — Leonard Saint-Cyr
(74) *Attorney, Agent, or Firm* — Lee & Hayes, P.C.

(57) ABSTRACT

Technologies are disclosed for disambiguating contact information using relationship data using a virtual assistant. A user interacts with a virtual assistant to obtain and utilize contact information. For example, a virtual assistant may allow users to perform an action that utilizes contact information (e.g., make a call to a contact). The virtual assistant utilizes a contact service to identify candidate contacts that are related to the requesting user. The contact service identifies candidate contacts based on relationship data between the requesting user and the stored contacts. For example, the relationship data may indicate that the requesting user is on the same project or team as another contact, that the requesting user has the same role as another contact, that the requesting user is a manager of another contact, as well as other attributes. In some examples, the contact service limits the number of candidate contacts provided to requesting user.

20 Claims, 8 Drawing Sheets

(51) Int. Cl.
*G06F 16/901* (2019.01)
*G06F 16/9535* (2019.01)
*G10L 13/00* (2006.01)
*G10L 15/18* (2013.01)
*G10L 15/30* (2013.01)

(52) U.S. Cl.
CPC .......... *G06F 16/9535* (2019.01); *G10L 13/00* (2013.01); *G10L 15/1815* (2013.01); *G10L 15/30* (2013.01); *G10L 2015/223* (2013.01)

(56) References Cited

U.S. PATENT DOCUMENTS

| | | | |
|---|---|---|---|
| 2008/0133235 A1* | 6/2008 | Simoneau | G10L 15/197 704/243 |
| 2009/0092241 A1* | 4/2009 | Minert | G06Q 10/063112 379/265.06 |
| 2010/0246784 A1* | 9/2010 | Frazier | H04L 67/63 707/E17.014 |
| 2011/0170682 A1 | 7/2011 | Kale et al. | |
| 2011/0288868 A1 | 11/2011 | Lloyd et al. | |
| 2012/0022874 A1 | 1/2012 | Lloyd et al. | |
| 2012/0278076 A1 | 11/2012 | Lloyd et al. | |
| 2014/0066044 A1 | 3/2014 | Ramnani et al. | |
| 2016/0098991 A1 | 4/2016 | Luo et al. | |
| 2016/0196586 A1 | 7/2016 | Gonen et al. | |
| 2016/0239165 A1 | 8/2016 | Chen et al. | |
| 2017/0272401 A1 | 9/2017 | Brockington et al. | |
| 2018/0165656 A1 | 6/2018 | Tessler | |

OTHER PUBLICATIONS

Office Action for U.S. Appl. No. 16/588,790, dated Nov. 29, 2021, Shivalingalah, "Disambiguating Contacts Using Relationship Data", 21 pages.

Office Action for U.S. Appl. No. 16/588,790, dated Mar. 2, 2022, Shivalingalah, "Disambiguating Contacts Using Relationship Data", 22 pages.

Office Action for U.S. Appl. No. 16/588,790, dated Jul. 8, 2021, Shivalingaiah, "Disambiguating Contacts Using Relationship Data", 17 pages.

* cited by examiner

DISAMBIGUATING CONTACTS USING RELATIONSHIP DATA

RELATED APPLICATIONS

This application claims priority to and is a continuation of U.S. patent application Ser. No. 16/588,790, filed on Sep. 30, 2019, the entire contents of which are incorporated herein by reference.

BACKGROUND

Today, a user may utilize a variety of different tools to locate contact information for a particular user. For example, the user may use a contact manager application to access contact information (e.g., names, addresses, telephone numbers) for another user. In some cases, a user might use a virtual assistant to locate contact information. For example, the user might request the contact information for a particular user by uttering a voice command (e.g., "Virtual Assistant: Please access the contact information for Samantha Jones").

Even though different tools exist to locate and utilize contact information for a particular user, these tools may not be very effective in practice. For example, when there are thousands of contacts in a contact database that have the same or similar names, it may be very difficult and time consuming for the user, or the tool, to locate the contact information requested by the user. For example, trying to locate contact information for a user named "John" may be very difficult as there may be hundreds or more users named John within the contact database.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
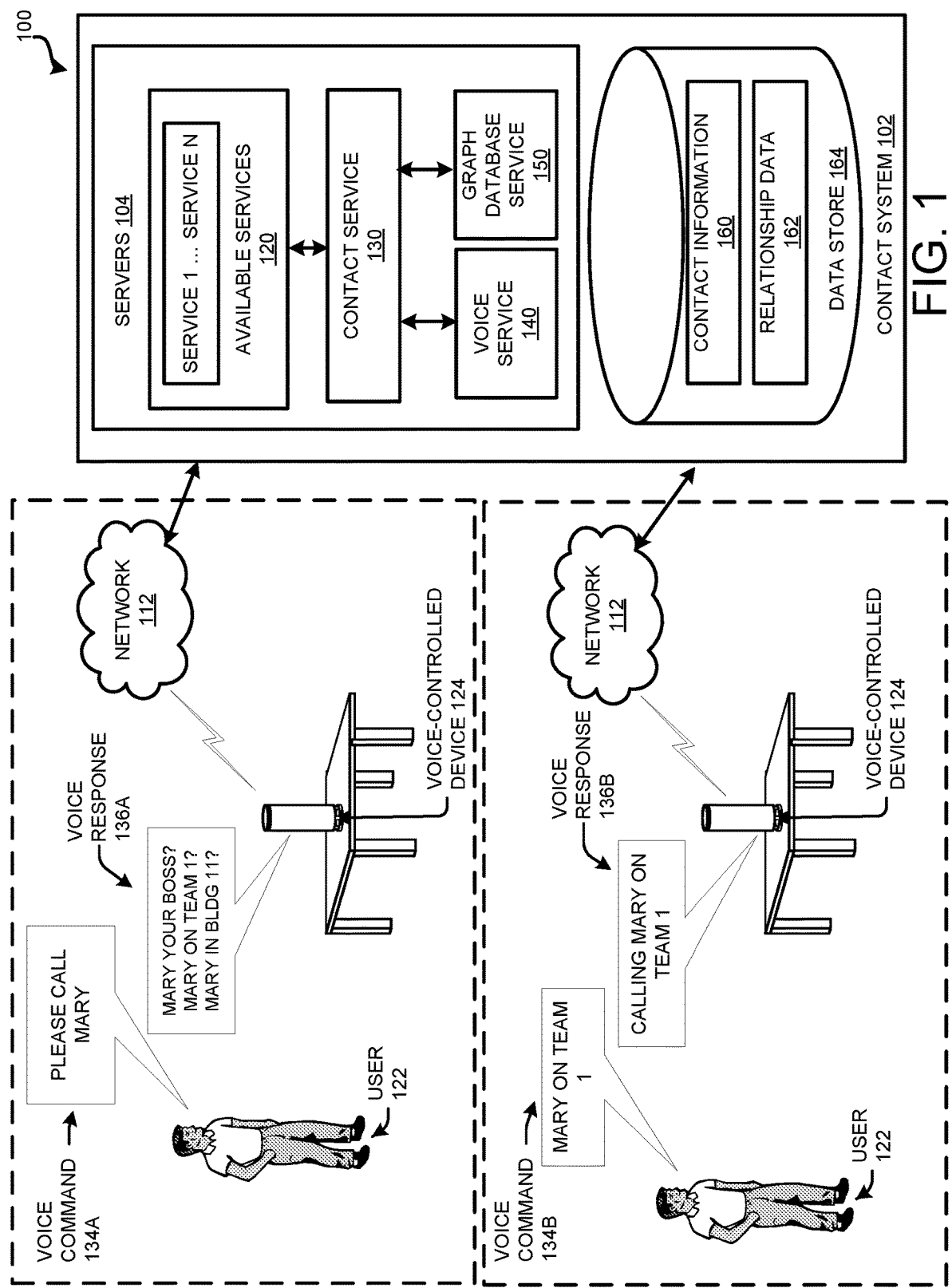
FIG. 1 is a software and network architecture diagram showing aspects of the configuration and utilization of a contact system for disambiguating contacts using relationship data and a virtual assistant.

The following detailed description is directed to technologies for disambiguating contact information using relationship data. As used herein, "contact information" refers to data that indicates information that may be used to identify or contact a user or resource. Contact information may include but is not limited to names, electronic addresses, physical addresses, telephone numbers, titles, roles, and the like. A user or resource that is associated with contact information may be referred to herein as a "contact".

Utilizing techniques described herein, a virtual assistant, or some other application or service, utilizes a contact service to identify candidate contacts using relationship data. As used herein "candidate contacts" are contacts that indicate a relationship between a user and one or more other contacts and "relationship data" is data that can be utilized to identify a relationship between two or more contacts. According to some configurations, the contact service identifies candidate contacts based on one or more relationships identified from the relationship data between a user and the contacts being searched. For example, the relationship data may indicate that the user is on the same project or team as another contact, that the user has the same role as another contact, that the user is a manager of another contact, that the user has frequently interacted with another contact, and/or other attributes that indicate a relationship.

Using relationship data to disambiguate contacts assists in reducing the number of contacts that are similar to or match a search term(s) provided by a requesting user, application, and/or service. For example, instead of providing a large number of unrelated contacts to a requesting user, application, or service for disambiguation, a limited number of related contacts may be provided for disambiguation. The use of relationship data to disambiguate the contacts can also reduce the use of computational resources to locate contacts from a large database of contacts.

In some examples, the relationship data is associated with contact information of an enterprise. As used herein, an "enterprise" is an entity that includes thousands of contacts (e.g., >5000 contacts). Enterprises are typically large corporations that manage hundreds or even thousands of employees. Unlike a personal contact database that may store contact information for hundreds of users, an enterprise contact database may store contact information for thousands of users. Locating a contact intended by the requesting user becomes may become more difficult as the size of the contact information grows. For example, a large data store of contact information makes it more likely that other contacts may have a same name (e.g., many employees named "Jane", "Sam", and the like) or similar sounding name.

According to techniques described herein, a user may interact with a virtual assistant to utilize contact information. Generally, a "virtual assistant" as used herein refers to software and/or hardware that receives input from a user and completes tasks for the user. As described herein, the virtual assistant is configured to understand natural language voice commands and complete tasks for the user, such as receiving/providing/utilizing contact information. For example, a virtual assistant may allow users to request contact information about another user and/or to perform an action (e.g., make a call to a contact, book a meeting room, schedule a meeting, and the like). In some examples, the virtual assistant listens for speech from users in an environment that is associated with receiving/providing contact information.

According to some configurations, the virtual assistant attempts to determine an identity of the requesting user providing the speech. For instance, the virtual assistant may be configured to identify the speech of employees of a company, other authorized users, and the like. In this way, the contact system may determine contacts that are related to the requesting user and/or provide contact information and/or other information that is personalized for the requesting user. In some configurations, the virtual assistant identifies speakers using voice profiles described in more detail below. As used herein, an "authorized user" refers to a user that is identified (e.g., by the virtual assistant) and that is determined to be authorized to request and/or utilize contact information.

In other configurations, an application or another service may request disambiguation of contacts using relationship data. For instance, a messaging application/service may request that the contact service identify candidate contacts that are related to a particular user based on one or more search term(s). As an example, the messaging application/service may request candidate contacts for user "John Alexis Smith" that are identified from a search term of a partial name (e.g., Johnny) and/or another attribute (e.g., VP of Operations). In this way, different applications/services do not need to independently develop functionality to disambiguate contacts.

In some examples, an authorized user may add/remove/adjust attributes or other relationship data that are associated with the contacts being searched. For instance, an Application Programming Interface (API), or some other mechanism or component, can be utilized by an authorized user to associate relationship data with some or all of the contacts. As an example, an attribute that identifies the "role" of the user within an enterprise may be associated with at least a portion of the contacts. Generally, one or more attributes can be associated with contacts such that the contact service can determine if there is a relationship between the requesting user and the contact.

According to some configurations, the attributes may be nodes within a contact graph that are associated with contacts. In this way, nodes having similar attributes may be located more quickly in a search of a contact graph performed by a contact service as compared to searching a relational database for particular terms. According to some examples, the contact service utilizes a graph database search service to search one or more contact graphs to disambiguate and identify candidate contacts that are related to a user. As such, when a requesting user asks the virtual assistant "Call John", the virtual assistant responds saying "John, the software developer, John the manager?", or some other saying. Similarly, when an application or service asks for contacts relating to a particular user, the contact service returns one or more candidate contacts that are related to the particular user. Other attributes may also be utilized by the contact service to identify candidate contacts based on relationship data. By returning contacts that have a relationship with the requesting user, the candidate contacts identified by the contact service are more likely to include the contact that the requesting user intended.

According to some examples, the contact service limits the number of candidate contacts provided to the requesting user. For instance, the contact service may limit the number of candidate contacts to a specified number (e.g., 1, 2, 3, 5, . . . ). After identifying the candidate contacts to provide to the requesting user, the virtual assistant may request that the request user identify the intended contact when more than one candidate contact is provided. For example, the virtual assistant may ask the user which of three candidate contacts did the user intend to call. In other examples, the requesting user may use a user interface (UI) or some other input mechanism to select a contact from the candidate contacts. Upon receiving the indication of the selected contact from the user, the virtual assistant may cause the to be performed action (e.g., calling the selected contact).

In some configurations, the contact information that is provided to a requesting user may be personalized. For instance, when the requesting user is determined to be a supervisor of one of the candidate contacts, the contact service may provide more details via the virtual assistant compared to when one or more of the candidate contacts are unknown by the requesting user. In addition to providing auditory information, the virtual assistant and/or some other device in the environment, may provide other types of contact information such as visual information. For instance, a display associated with the requesting user may present candidate contacts from which the requesting user may select a contact. In some configurations, the virtual assistant might also display a picture or text indicating the contact information. The virtual assistant may also provide other information such as a calendar associated with the selected contact, contact information associated with the selected contact, and the like.

According to some examples, the contact service may access other services to obtain data that may be used to disambiguate contacts. For example, the contact service might access a calendar service and/or a messaging service to identify how frequently the requesting user interacts with different contacts. Additional details regarding the various components and processes described briefly above for disambiguating contact information using relationship data will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, where tasks can be performed by remote computing devices that are linked through a communications network. In a distributed computing environment, program modules can be located in both local and remote storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the configuration and utilization a contact system for disambiguating contacts using relationship data and a virtual assistant. It is to be appreciated that the environment 100 is merely illustrative and that the various configurations disclosed herein can be utilized in many different types of computing environments.

To provide the contact service 130 and the other functionality disclosed herein, the contact system 102 may include one or more servers 104. The servers 104 can execute software components to provide the services described herein, including contact service 130 functionality using a virtual assistant and different services provided by a service provider and/or some other entity. The software components can execute on a single server 104 or in parallel across multiple servers in the contact system 102. In addition, a software component can consist of subcomponents executing on different servers 104 or other computing devices in the contact system 102. Various components can be implemented as software, hardware, or any combination of the two. In this regard, it is to be appreciated that the contact system 102 shown in FIG. 1 has been simplified for discussion purposes and that many additional software and hardware components can be utilized.

A user 122 of the contact system 102 can utilize a virtual assistant, via a voice-controlled device 124 or some other input device, to access the contact system 102 through a network 112. According to some configurations, the virtual assistant is configured to understand natural language voice commands and complete tasks for the user, such as receiving/providing/utilizing contact information 160. The user 122 can be an individual that desires to receive contact information and/or utilize contact information to have actions performed that are associated with the contact system 102. In some examples, the user 122 is a customer of the service provider network.

The voice-controlled device 124 is an input device configured to receive voice queries/commands/utterances (which may collectively be referred to herein as "voice commands") from the user and provide data to a virtual assistant. The voice-controlled device 124 may include one or more microphones for capturing audio data (e.g., voice utterances or commands of users) within an environment 100 and generating audio signals that represent or are otherwise associated with sound (e.g., the audio data) from the environment 100, including the voice utterances/commands of the users.

The voice-controlled device 124 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, or any other type of computing device capable of connecting to the network 112 and communicating with the contact system 102. In other configurations, the voice-controlled device 124 may be configured to communicate with one or more other devices to receive voice commands from users and/or perform processing related to functionality of the contact system 102.

In some configurations, the voice-controlled device 124 may be configured to perform speech recognition, such as automatic speech recognition (ASR), on the audio signals to identify words or phrases associated with the voice commands therein or may be configured to provide the audio signals to another device (e.g., a remote service such as contact system 102) for performing the ASR on the audio signals for identifying the voice commands. In other examples, ASR may be performed by a different computing system and/or service.

As used herein, performing ASR on an audio signal to identify a voice command may include translating speech represented in the audio signal into text and analyzing the text to identify the voice command. Analysis of the text may be performed, locally by the voice-controlled device 124 and/or remotely by the one or more servers 104 (or other remote services), using natural language processing (NLP) and/or natural language understanding (NLU) techniques in order to determine an intent associated with the voice command.

As illustrated in FIG. 1, a user 122 may interact with the voice-controlled device 124 within the environment 100 by using voice commands. For instance, the user 122 may make a request to the voice-controlled device 124 that utilizes contact information 160 (e.g., "Please Call Mary") as indicated by voice command 134A. Many other voice commands 134 can be utilized to interact with the contact system 102, such as "Please tell me John's contact information", "Please update Sam's contact information", "Please reserve the conference room", "Please reserve a meeting time at 12 PM for thirty minutes with Jane", and the like. In each example, the voice-controlled device 124 may interact with one or more remote services, discussed below, to receive and provide and utilize contact information 160.

As illustrated, the voice-controlled device 124, or some other device or component, may couple with a contact system 102 over a network 112. As briefly discussed above, and in more detail with regard to FIG. 2, one or more applications and/or services may also interact with the contact system 102 over a network 112 for disambiguation of contacts. The network 112 may represent an array or wired networks, wireless networks (e.g., Wi-Fi), or combinations thereof. The contact system 102 may generally refer to a network-accessible platform implemented as a computing infrastructure of processors, storage, software, data access, and so forth that is maintained and accessible via the network 112, such as the Internet. These services may not require end-user knowledge of the physical location and configuration of the system that delivers the services. Common expressions associated with these remote services, such as the contact system 102, include "on-demand computing", "software as a service (SaaS)", "platform computing", "network accessible platform", and so forth.

As illustrated, the contact system 102 may comprise one or more network-accessible resources, such as servers 104. These resources comprise one or more processors and computer-readable storage media executable on the processors. In some configurations, the user 122 and/or the user 122 may be identified and/or authenticated before interacting with the voice-controlled device 124 that is associated with the contact system 102. In some examples, the voice-controlled device 124 is awakened upon identifying a predefined wake word. After being awakened, the voice-controlled device 124 may upload an audio signal representing sound captured in the environment 100 to the contact system 102 over the network 112.

In other configurations, the virtual assistant provided via the voice-controlled device 124 may be awoken using some other technique. In response to receiving this audio signal, the voice service 140 may perform ASR, NLU, and/or NLP on the audio signal to identify one or more user voice commands therein. For instance, in the illustrated example, the voice service 140 may identify the user 122 asking the voice-controlled device 124 to call Mary.

The network 112 can be a local-area network ("LAN"), a wide-area network ("WAN"), the Internet, or any other networking topology known in the art that connects the user devices to the contact system 102. The user 122 can use an application (not shown) executing on voice-controlled device 124 to access and utilize the contact service functionality provided by the servers 104. In some examples, the application is a web browser application (not shown), such as the Amazon® Silk® web browser, or some other web browser. Generally, a web browser application exchanges data with the servers 104 in the contact system 102 using the hypertext transfer protocol ("HTTP") over the network 112. The application might also be a stand-alone client application configured for communicating with the servers 104.

The client application can also utilize any number of communication methods known in the art to communicate with the contact system 102 and/or the servers 104 across the network 112, including remote procedure calls, SOAP-based web services, remote file access, proprietary client-server architectures, and the like. According to some configurations, the application may provide a user interface that can be utilized by the user 122 to configure settings associated with the contact service and/or the voice-controlled device 124. Typically, a user 122 interacts with the voice-controlled device 124 using speech that is captured by one or more microphones of the voice-controlled device 124.

The voice service 140, or some other component may process a corresponding audio signal associated with the audio data/voice command to determine words within the voice command (using automatic speech recognition techniques—ASR) and to determine an intent of the user (natural language processing techniques—NLU). Based on the identified words/intent, the voice service 140 can determine whether the voice command is related to the contact service 130 and/or some other service or functionality.

As briefly discussed above, the voice-controlled device 124 may act as an input device for a virtual assistant for authorized users, such as user 122. An authorized user, such as user 122, may interact with the voice-controlled device to access functionality of the contact system 120. In the example illustrated in FIG. 1, user 122 has uttered "Please call Mary" (voice command 134A) to the voice-controlled device 124. As briefly discussed above, the user 122 may utter other phrases to utilize the contact system 102. For example, the user 122 may utter "Please post on the community bulletin board that I am hosting a party", "Please message Frank that I will be late", and the like. In some examples, a voice command 134 may include reference to more than one contact (e.g., "Please post on the community bulletin board that I am hosting a party with Jill in the team conference room"). Generally, any voice command 134 that utilizes contact information 160 may be uttered by a user to access functionality of the contact service 130. The voice command 134A may be uttered by the user 122, captured by one or more microphones of the voice-controlled device 124, and stored by the voice-controlled device 124 and/or one or more remote devices/services. In other embodiments, the user 122 may input the voice command 134 via one or more input mechanisms (e.g., a keyboard, a display, etc.).

Upon receipt of the voice-command 134A, the voice-controlled device 124A, and/or the voice service 140, and/or some other component or service (local or remote from the voice-controlled device 124), may attempt to identify the speaker. According to some configurations, the voice service 140 compares the voice command 134 to voice profiles already created. The voice profiles may be stored in a data store, such as data store 164, associated with the contact system 102 and/or on the voice-controlled device 124, or some other location.

Generally, if the voice service 140 determines a match between a voice signature determined from the voice command 134 and a stored profile, an identity of the user 122 is determined. When no match is made, the voice-controlled device 124 may provide output to the user indicating that they are not recognized. In some examples, the voice-controlled device may provide the unrecognized user 122 an option to be identified using some other mechanism (e.g., logging into a system, providing further details, . . . ).

In the current example, user 122 is recognized to be an authorized user of the voice-controlled device 124. According to some examples, more than one user may be an authorized user of the voice-controlled device 124. For example, all or a portion of the employees of an enterprise, as well as other users, may be authorized. In response to user 122 providing voice command 134A, and the contact service 130 identifying candidate contacts (as discussed in more detail below), the voice-controlled device 124 provides voice response 136A (e.g., "Mary your boss?", "Mary on Team 1?", and "Mary in Building 11?", or some other message). In some configurations, information generated by the contact service 130, or some other component or device that is located remotely from the voice-controlled device 124, may be stored locally such that if the contact service 130 is not accessible for some period of time, the voice-controlled device 124 may access the information that may be processed locally by the voice-controlled device 124 or some other computing device.

In the current example, in response to listening to the voice response 136A, the user 122 indicates the desired contact by uttering the voice command 134B (e.g., "Mary on Team 1"). After identifying the selected contact, the contact service 130, or some other component or device, may initiate the call to Mary, which is confirmed by the voice-controlled device through voice response 136B (e.g., "Calling Mary on Team 1").

In some configurations, the contact service 130 may determine a level of detail to provide in a voice response 136. For instance, the contact service 130 may determine the level of detail to provide to a requesting user 122 based on a determined relationship of the requesting user 122 to the candidate contacts and "opt-in" authorization received by users associated with the contacts. For example, a requesting user 122 that is in the same work group of a contact may receive a first message, a requesting user 122 that is a boss of the user 122 may receive a second message, a requesting user 122 that is in another group may receive a third message, an unknown user may receive a fourth message, and the like.

In addition to providing auditory information, the voice-controlled device 124 and/or some other device in the environment 100, may provide other types of contact information 160 such as visual information. For instance, the voice-controlled device 124 might display a picture or text indicating contact information of the candidate contacts.

Figure 2:
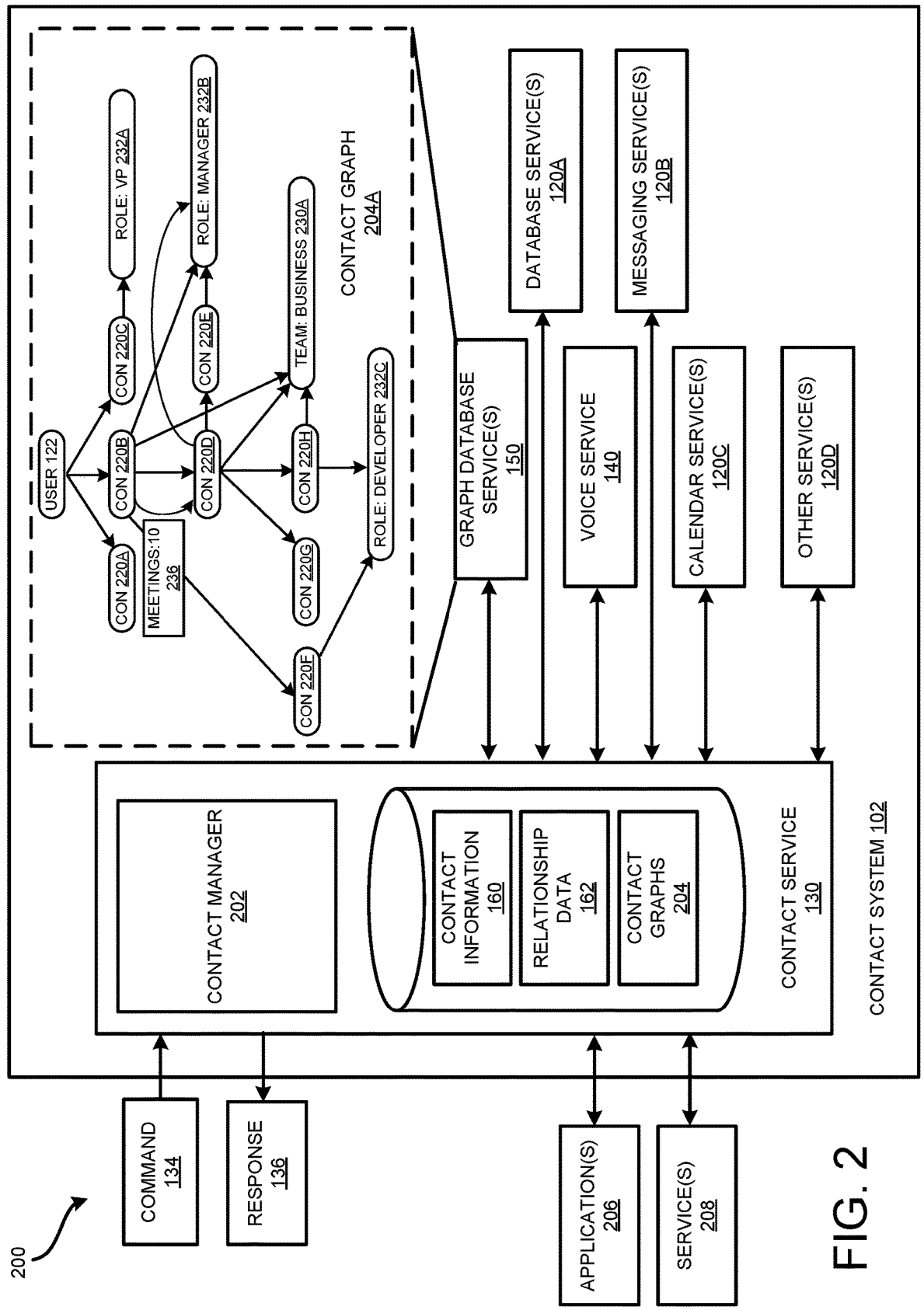
FIG. 2 is a software and network architecture diagram showing aspects of a contact system to provide contact information using a graph database service and other services associated with a service provider.

As briefly discussed above, the contact service 130 disambiguates contact information using relationship data 162 and provides a limited number of candidate contacts to the requesting user 122. According to some examples, the relationship data 162 can be expressed as a contact graph 204 as shown in FIG. 2. In some examples, the contact service 130 limits the number of candidate contacts provided to requesting user 122. In the current example, instead of providing the requesting user 122 all of the contacts that match or are similar to the name "Mary", the contact service 130 utilizes the relationship data 162 to disambiguate contacts associated with an enterprise and provide related contacts as opposed to unrelated contacts. In some examples, the contact service 130 may provide a single candidate contact to the requesting user 122. For instance, the contact service 130 may return a single candidate contact to the requesting user 122 based on prior searches and selection by the user (e.g., the requesting user has selected the same contact three times in a row), or the single contact is determined to be the most likely intended contact. Prior to utilizing techniques described herein, many unrelated contacts may be returned to a requesting user for disambiguation when there are a large number of the same or similar sounding contacts.

According to some examples, the contact service 130 identifies one or more candidate contacts based on one or more relationships identified from relationship data 162 that indicates a relationship between the requesting user 122 and other contacts. For example, the relationship data 162 may indicate that the requesting user 122 is on the same project or team as another contact, that the requesting user has the same role as another contact, that the requesting user is a manager of another contact, as well as other attributes.

In some configurations, an authorized user may add/remove/adjust attributes or other relationship data 162 that are associated with contacts. For instance, an Application Programming Interface (API) (as described in more detail below with regard to FIG. 2), or some other mechanism or component, can be utilized to associate relationship data 162 with some or all of the contacts. As an example, an attribute that identifies the "role" of the user within an enterprise may be associated with at least a portion of the contacts. As other examples, attributes that identify a "team", a "project", a "location", and the like may be associated with contacts. Generally, one or more attributes can be associated with contacts such that the contact service 130 can determine if there is a relationship between the requesting user and the contact.

As described in more detail in FIG. 2, the attributes may be nodes within a contact graph 204 that are associated with contacts. In this way, nodes having similar attributes may be located more quickly in a search of a graph as compared to searching a database for particular terms. According to some examples, the contact service utilizes a graph database service 150 to search one or more contact graphs to disambiguate contacts and identify candidate contacts that are related to the requesting user. As such, when a requesting user 122 asks the virtual assistant "Call John", the virtual assistant responds saying "John, the software developer, John the manager?", or some other saying. Other attributes may also be utilized by the contact service to identify candidate contacts based on relationship data 162. By returning contacts that have a relationship with the requesting user, the candidate contacts identified by the contact service are more likely to include the contact that the user intended.

According to some examples, the contact service 130 limits the number of candidate contacts provided to the requesting user 122. For instance, the contact service 130 may limit the number of candidate contacts to a specified number (e.g., 2, 3, 5, . . . ). After identifying the candidate contacts to provide to the requesting user 122, the virtual assistant may request that the requesting user 122 identify the intended contact. For example, the virtual assistant may ask the requesting user 122 which of three candidate contacts, such as in voice response 136A, did the requesting user 122 intend. In other examples, the requesting user 122 may use a user interface (UI) or some other input mechanism to select a contact. Upon receiving the indication of the selected contact from the user, the virtual assistant may cause the to be performed action (e.g., calling the selected contact).

In some examples, the contact information 160 that is provided, or accessed by the contact service 130, may be based on the identity of the requesting user 122. For instance, when the requesting user 122 is determined to be a supervisor of the selected contact, the contact service may provide more details via the virtual assistant compared to when the requesting user 122 has a different relationship to the selected contact. In addition to providing auditory information, the virtual assistant and/or some other device in the environment, may provide other types of contact information 160 such as visual information. For instance, a display associated with the requesting user 122 may present candidate contacts from which the requesting user may select a contact. In some configurations, the virtual assistant might also display a picture or text indicating the contact information 160. The virtual assistant may also provide other information such as a calendar associated with the selected contact, contact information associated with the contact, and the like.

According to some examples, the contact service 130 may access other available services 120 to obtain data that may be used to determine the candidate contacts (See FIG. 2 and related discussion). Additional details regarding the various processes described above with regard to FIG. 1 will be provided below with regard to FIGS. 2-8.

FIG. 2 is a software and network architecture diagram showing aspects of a contact system 102 to provide contact information 160 using a graph database service 150 and other services associated with a service provider network. It is to be appreciated that the environment 200 is merely illustrative and that the various configurations disclosed herein can be utilized in many different types of computing environments. FIG. 2 is similar to FIG. 1 but provides more details regarding the graph service 150, different services that can be utilized by the contact system 102 and use of the contact system 130 to disambiguate contacts by one or more applications 206 and/or one or more services 208.

As illustrated, contact system 102 includes contact service 130, voice service 140, graph database service(s) 150, database service(s) 120A, messaging service(s) 120B, calendar service(s) 120C, and other services 120D. The contact service 130 may communicate with the services and/or the one or more applications 206 and/or one or more services 208 using one or more Application Programming Interfaces (APIs). In some examples, each service may expose one or more APIs that can be used by another service, application, or some other component, to access functionality and/or data provided by a service. In some examples, the contact service 130, or some other service or component, may expose an API for the one or more applications 206 and/or one or more services 208 to access functionality of the contact service 130 for disambiguating contacts. In some configurations, the contact service 130 provides an API that exposes functionality for associating relationship data 162 with contact information 160.

According to some examples, an API may expose functionality for creating contacts, creating relationship attributes, attaching relationship attributes to specified contacts, getting relationship attributes, and listing relationship attributes utilized. The following is an exemplary API, according to some examples:

| API | Notes | Parameters | Returns |
|---|---|---|---|
| CreateEntityBatch | Creates a contact with given parameters, that has a unique contact ID-this links to the contact ID present in a database maintained by database service(s) 120 | entityType, List<entity> | List <entityOperationResult> |
| Create Relationship Attribute | Creates Attribute that can link any two contacts/entities in the model | Name | Id |
| AttachRelationshipAttribute | Associates an Attribute with a list of entities, for instance, associate 5 employees to the role "software Developer" | Id List<entity> | List <entityOperationResult> |
| GetRelationshipAttribute | Gets an ID when name is input | Name | Id |
| ListAttribute | Gets a list of Attributes present | organizationId | List<Object> |

According to some configurations, the contact service 130 is configured to access graph database service(s) 150 and/or database service(s) 120A to search for candidate contacts. For instance, in the example illustrated in FIG. 2, the graph database service 150 access a contact graph 204A to identify candidate contacts that are related to the requesting user 122 who uttered the voice command 134.

According to some examples, a contact graph 204 indicates relationships between the requesting user 122, or some other identified user, and other contacts associated with the contact information 160. The graph database service 150 is configured to work with highly connected datasets. In some examples, the graph database service 150 may store billions of relationships and querying a contact graph 204, such as contact graph 204A, may have a very small latency (e.g., a few milliseconds). In some examples, the graph database service 150 supports contact graph models such as Property Graph and W3C's Resource Description Framework (RDF), and their respective query languages Apache TinkerPop Gremlin and SPARQL (an RDF query language). Generally, the graph database service 150 is configured to interact and search attributed, multi-relational graphs where the edges may be labeled and both vertices and edges can have any number of key/value properties associated with them.

As illustrated, the graph database service 150 is configured to interact with contact graphs 204 that indicate relationships between nodes of the contact graph 204. Graph databases can have advantages over relational databases for use cases that involve relationship data, like contacts of an enterprise, social networking, recommendation engines, where relationships are created between data and quickly query these relationships. As illustrated, the contact graph 204A incudes nodes representing contacts 220A-220H, role attribute nodes 232A-232C associated with different roles, an edge 236 that indicates a frequency of meetings between two contacts, and a team attribute node that indicates a team of one or more of the contacts. Referring to contact graph 204A, the relationships between user 122 and contacts 220A-220H can be seen. More or fewer attributes that indicate a relationship may be associated with contacts.

There are a number of challenges to building these types of applications using a relational database, that may be associated with database service(s) 120A. A relational database would utilize multiple tables with multiple foreign keys. SQL queries to navigate this data would utilize nested queries and complex joins that quickly become unwieldy, and the queries would not perform well as the data size increases.

A graph database uses graph structures, such as contact graph 204, that includes nodes (e.g., contacts in this example), edges (relationships such as frequency of interaction), and properties to represent and store data. The relationships are stored as first order citizens of the data model. This allows data in nodes to be directly linked, dramatically improving the performance of queries that navigate relationships in the data. In the current example, referring to contact graph 204A it can be easily seen how the requesting user 122 relates to other contacts 220. It can also be seen how other contacts relate to yet other contacts in the contact graph 204A. In some examples, a portion of contact information 160 (e.g., telephone number(s), location(s), . . . ) may be stored by another database, such as a relational database maintained by database service(s) 120A and linked to the contacts 220 in the contact graph 204A.

As briefly discussed above, the contact service 130 may also access other service(s) to assist in identifying the candidate contacts and/or for creation of a contact graph, such as contact graph 204A. According to some configurations, the contact service 130 is configured to access calendar service(s) 120D to obtain data of one or more work calendars, or other calendars, associated with user 122. For example, calendar data provided by calendar service(s) 120C may be used by the contact service 130 to determine how often a user has met with other contacts. In contact graph 204A it can be seen that contact 220B has met with contact 220F ten times.

In some examples, the contact manager 202 may also access one or more messaging service(s) 120B. The contact manager 202 may send messages using one or more of the messaging service(s) 120B. The contact service 120B may also access messaging data received from one or more of the messaging service(s) 120B to determine how often a user has messaged another contact. In other configurations, an authorized user, such as user 122, may authorize ("opts-in") the contact service 130 access to content of messages (e.g., emails, text messages, . . . ) of the user. According to this example, the contact service 130 may access the content of one or more messages to determine message content that indicates contact information associated with the user and interactions with other users.

The voice service 140 may include a voice interface that may comprise one or more components configured to receive audio signals generated by the voice-controlled device 124 and perform ASR, NLP, and/or NLU on the audio signals to identify users and voice commands.

In some configurations, the other service(s) 120D may include a vision service (not shown) that may include a vision interface to identify requests of the user made via user gestures and route the requests to the appropriate domain. In some examples, the vision service may be used by the contact manager 202 to identify and/or authenticate a user. The other service(s) 120D may provide other functionality not specifically discussed herein.

Figure 3:
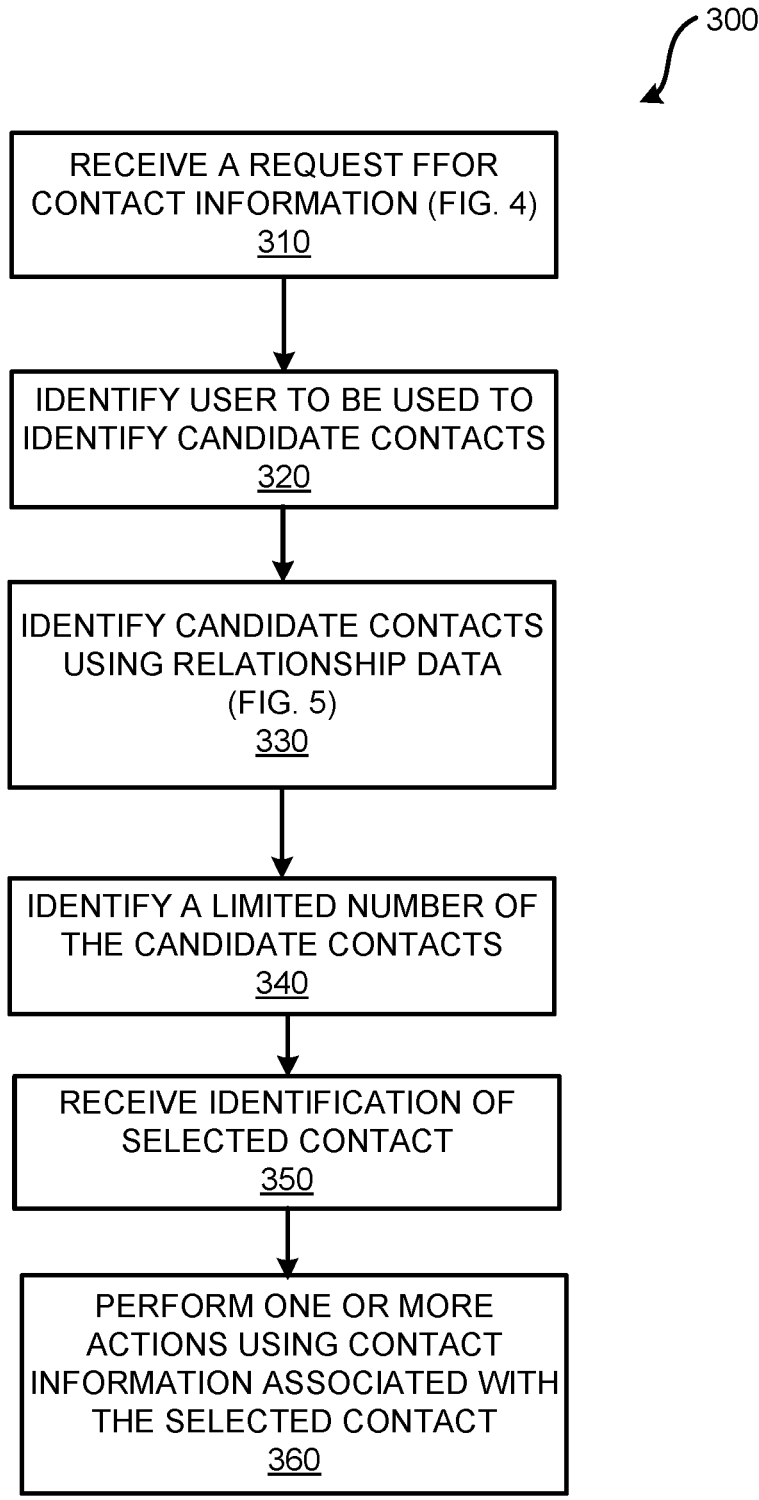
FIG. 3 is a flow diagram showing an illustrative routine for disambiguating contacts using relationship data.
Figure 4:
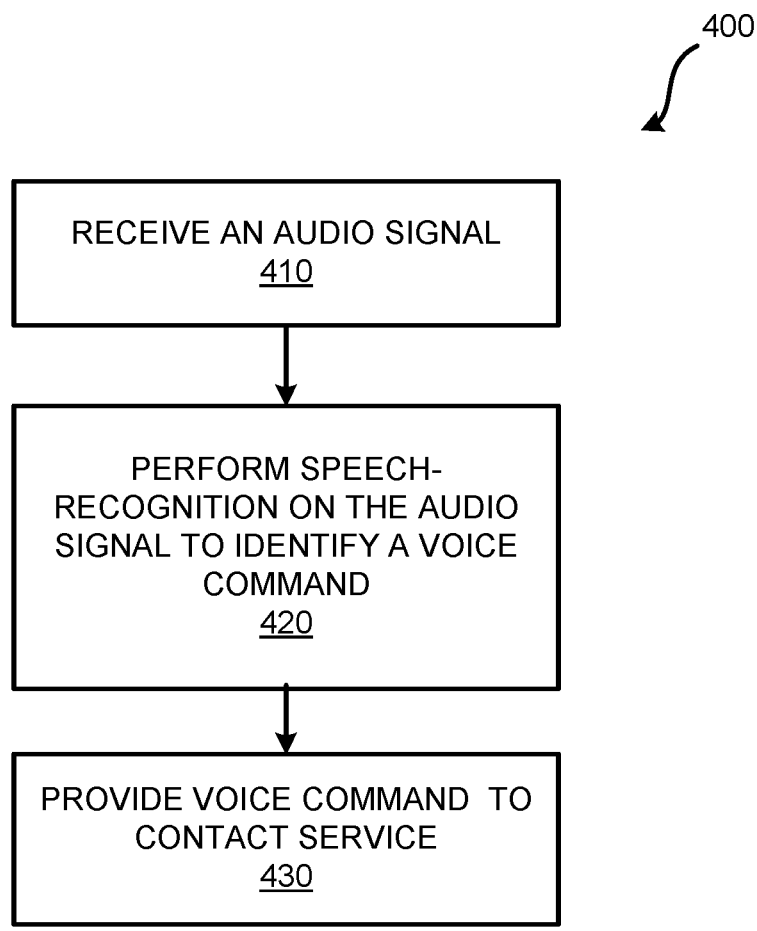
FIG. 4 is a flow diagram showing an illustrative routine for processing an auditory input associated with a virtual assistant.
Figure 5:
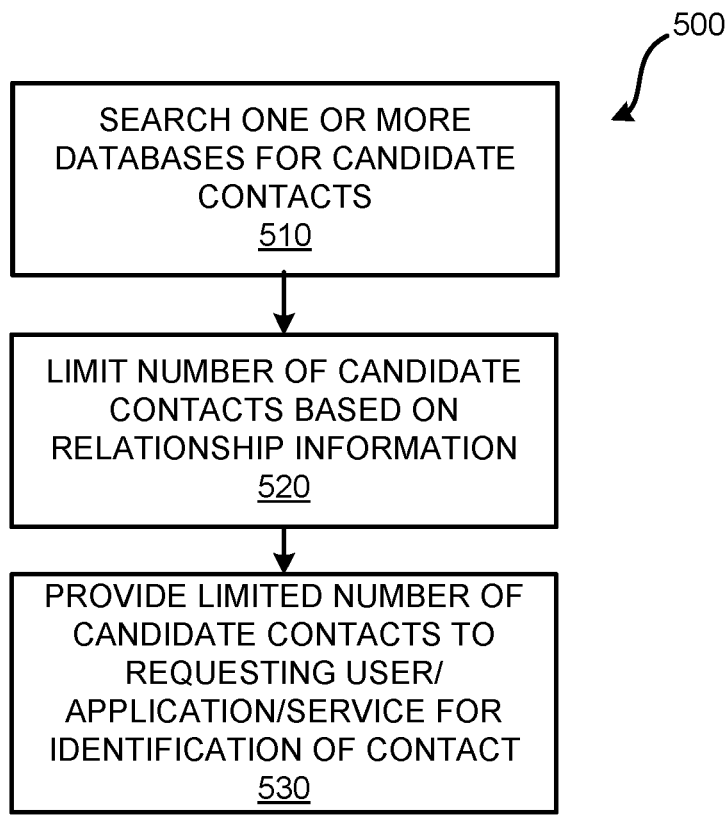
FIG. 5 is a flow diagram showing an illustrative routine for locating and providing contacts using relationship data.

FIGS. 3-5 are flow diagrams showing illustrative routines 300, 400, and 500 for disambiguating contact information using relationship data, according to examples disclosed herein. It should be appreciated that the logical operations described herein with respect to FIG. 3, FIG. 4, FIG. 5, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 3 is a flow diagram showing an illustrative routine for disambiguating contacts using relationship data. At 310, a request is received for contact information 160. As discussed above, the request may come from an application 206, a service 208, or a user 122. For example, the user 122 may provide a voice command 134B that requests contact information about a second user and/or resource of the enterprise. Generally, the voice command 134A includes one or more terms provided by the user 122 that are used by the contact service 130 to identify candidate contacts from thousands of contacts associated with the enterprise. For example, the voice-controlled device 124 may receive the voice command 134A using speech uttered by the user 122. In other examples, a user interface can be provided for submitting a query to the contact service 130. In yet other examples, one or more applications 206, and/or one or more services 208 may request disambiguation of a contact from contact service 130. For instance, the one or more applications 206, and/or the one or more services 208 may utilize one or more APIs to interact with the contact service 130.

In other examples, the contact system 102 may cause a voice-controlled device 124 to audibly output audio data prompting the user 122 to provide the voice command 134A. For instance, via one or more speakers of the voice-controlled device 124, the contact system 102 may cause the voice-controlled device 124 to audibly output, "Would you like to call someone?" or something similar.

The voice command 134 may be audibly uttered by the user 122, which is captured by one or more microphones of the voice-controlled device 124. Regardless of how the voice command 134A is provided by the user 122, the voice-controlled device 124 and/or the contact system 102 may process the voice command 134, possibly using one or more speech recognition techniques (ASR) or one or more natural language processing techniques (NLU) in order to determine an intent associated with the search voice command 134 (See FIG. 4).

At 320, the user to be used to identify candidate contacts may be identified. As discussed above, the contact service 130, and/or some other component or service, may identify the requesting user 122 by comparing stored voice signatures/profiles of previously identified users. In some examples, the identity of the requesting user 122 may be determined using some other technique or mechanism. For example, a vision service may visually identify the requesting user 122. In yet other examples, an application 206, or a service 208 may identify the user. For instance, the application 206, or a service 208 may provide the name of a user using an API.

At 330, candidate contacts are identified using relationship data. As discussed above, a search of one or more databases and/or contact graphs 204 may be performed to identify candidate contacts. In some configurations, the contact service 160 may utilize one or more other services, such as the graph database service(s), the database service(s) 120A, the messaging service(s) 120B, the calendar service(s) 120C, and/or other service(s) 120D to determine candidate contacts. As also discussed above, the relationship data may be associated with how close the candidate contacts are located within an organizational chart of the enterprise to the user, a team name or project name that is associated with the user and the candidate contacts, a location of the candidate contacts in relation to the user, a frequency of interaction between the user and the candidate contacts, and/or other attributes that indicate a relationship (See FIG. 5).

At 340, the contact service 130 identifies a limited number of the candidate contacts to provide to the requesting user 122 and/or to the application 206 or service 208. As discussed above, the contact service 130 may limit the number of the candidate contacts to a predetermined number (e.g., 1, 3, 5, . . . ) based on a specification provided by an authorized entity of the enterprise and/or the requesting user 122.

At 350, the identification of the selected contact from the candidate contacts is received. As discussed above, the requesting user 122 may verbally identify the selected contact via a voice command 134, or provide the identification utilizing a UI, or identify the selected contact using some other mechanism.

At 360, one or more actions are performed using the contact information. For example, the selected contact may be called, a meeting room may be reserved, a message may be sent, contact information 160 may be provided to the requesting user 122, and the like.

FIG. 4 is a flow diagram showing an illustrative routine 400 for processing an auditory input associated with a virtual assistant, according to examples disclosed herein. The routine 400 begins at 410, where an audio signal is received. In some configurations, the audio signal is received from a voice-controlled device 124. The audio signal may include a voice command 134 of a user requesting to perform an action using contact information associated with a contact or receive contact information.

At 420, speech-recognition on the audio signal is performed to identify the voice command 134 of the user 122.

As discussed above, the voice-controlled device 124, the voice service 140, and/or some other component or device may determine whether the audio signal includes a voice command associated with contact information and/or the audio signal includes additional information or requests.

At 430, data associated with the voice command 134 is provided to the contact service 130. For example, the voice service 140 may determine that the user 122 has requested contact information about another user of the enterprise, or that the user 122 is providing contact information.

FIG. 5 is a flow diagram showing an illustrative routine 500 for locating and providing contacts using relationship data 162, according to examples disclosed herein.

At 510, one or more databases are searched to identify candidate contacts based on information received from user 122. As discussed above, the contact service 120 may utilize a graph database service 150 to search a graph database and/or other databases to identify candidate contacts. In some configurations, the contact service 130 provides data to the graph database service 150 that is utilized to obtain the candidate contacts.

At 520, the number of candidate contacts can be limited based on relationship data 162. As discussed above, in some examples, the contact service 130 attempts to identify a limited number of candidate contacts that are most likely the intended contact of the requesting user 122 based on a relationship between the user 122 and the candidate contacts.

At 530, the limited number of candidate contacts are provided to the user 122, the application 206, or the service 208. As discussed above, the limited number of candidate contacts may be audibly output via a voice command 134, provided via a UI, provided via an API, or using some other technique or mechanism.

Figure 6:
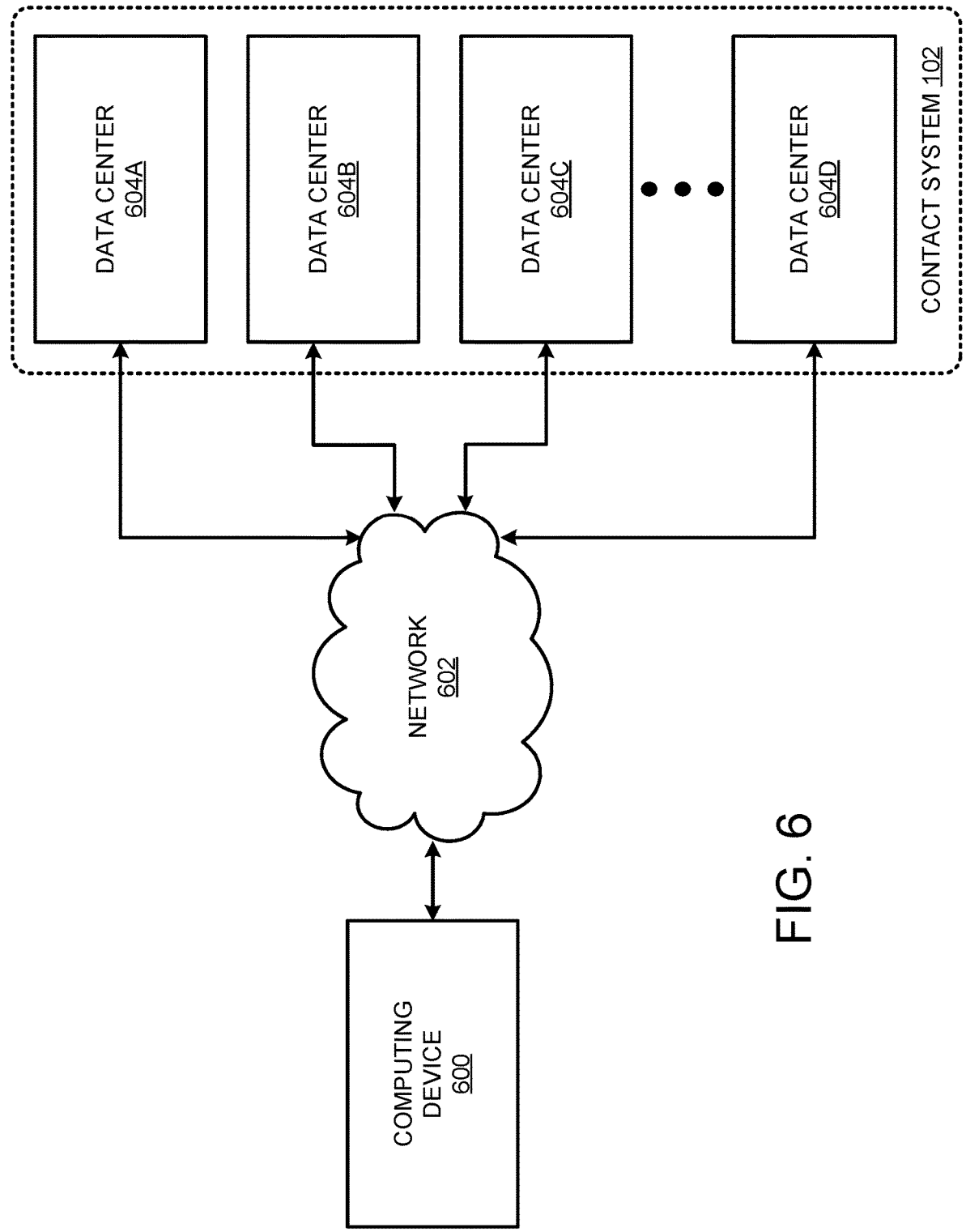
FIG. 6 is a system and network diagram that shows an illustrative operating environment including several data centers that can be configured to implement aspects of the functionality described herein.

FIG. 6 is a system and network diagram that shows one illustrative operating environment for the configurations disclosed herein that includes a contact system 102 that can be configured to provide the functionality described above. As discussed above, the contact system 102 can execute network services that provide computing resources for implementing the functionality disclosed herein. The computing resources implemented by the contact system 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The contact system 102 can also include and utilize other types of computing resources not mentioned specifically herein.

As also discussed above, the computing resources provided by the contact system 102 are enabled in one implementation by one or more data centers 604A-604D (which might be referred to herein singularly as "a data center 604" or collectively as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that can be utilized to implement the technologies disclosed herein will be described below with regard to FIG. 8.

The users can access the services provided by the contact system 102 over a network 602, which can be a wide area communication network ("WAN"), such as the Internet, an intranet or an Internet service provider ("ISP") network or a combination of such networks. For example, and without limitation, a computing device 600 operated by a user or other user of the contact system 102, such as the voice-controlled device 124, can be utilized to access the contact system 102 by way of the network 602. It should be appreciated that a local-area network ("LAN"), the Internet, or any other networking topology known in the art that connects the data centers 604 to remote users and other users can be utilized. It should also be appreciated that combinations of such networks can also be utilized.

Figure 7:
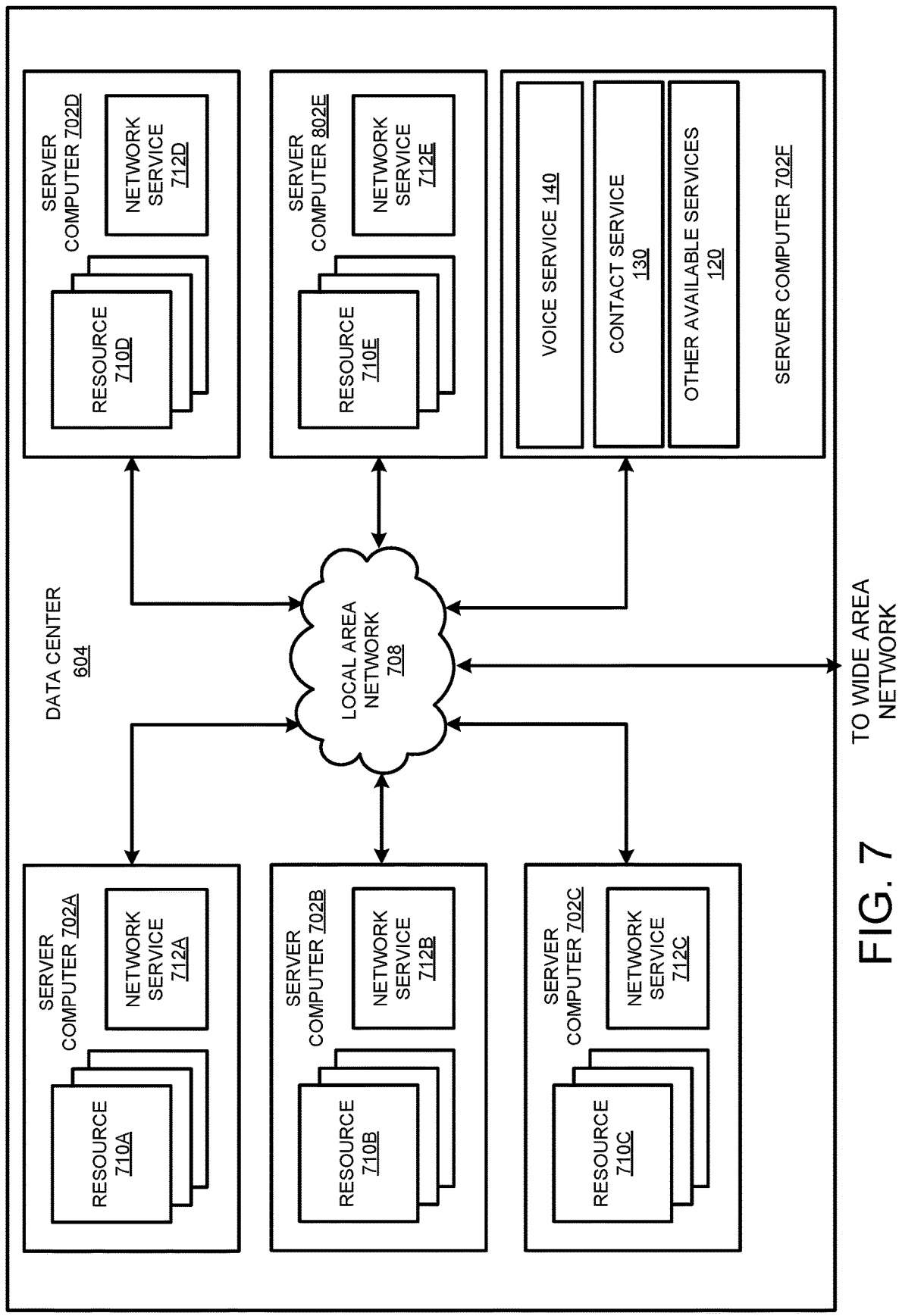
FIG. 7 is a computing system diagram illustrating a configuration for a data center that can be utilized to implement aspects of the technologies disclosed herein.

FIG. 7 is a computing system diagram that illustrates examples for a data center 604 that can be utilized to implement the voice service 140, the contact service 130, other available services 120, and the other functionality disclosed herein. The example data center 604 shown in FIG. 7 includes several server computers 702A-702F (which might be referred to herein singularly as "a server computer 702" or in the plural as "the server computers 702").

The server computers 702 can be standard tower, rack-mount, or blade server computers configured appropriately for providing various types of computing resources 710 for implementing the functionality disclosed herein. As mentioned above, the computing resources 710 provided by the data center 604 can be data processing resources such as VM instances or hardware computing systems, data storage resources, database resources, networking resources, and others. Some of the servers 702 can also be configured to execute network services 712A-712-E, respectively, capable of instantiating, providing and/or managing the computing resources 710A-710E.

The data center 604 shown in FIG. 7 also includes a server computer 702F that can execute some or all of the software components described above. The server computer 702F can also be configured to execute other components and/or to store data for providing some or all of the functionality described herein. In this regard, it should be appreciated that components or different instances of the services can execute on many other physical or virtual servers in the data centers 604 in various configurations.

In the example data center 604 shown in FIG. 7, an appropriate LAN 708 is also utilized to interconnect the server computers 702A-702F. The LAN 708 is also connected to the network 602 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 604A-604D, between each of the server computers 702A-702F in each data center 604, and, potentially, between computing resources 710 in each of the data centers 604. It should be appreciated that the configuration of the data center 604 described with reference to FIG. 7 is merely illustrative and that other implementations can be utilized.

Figure 8:
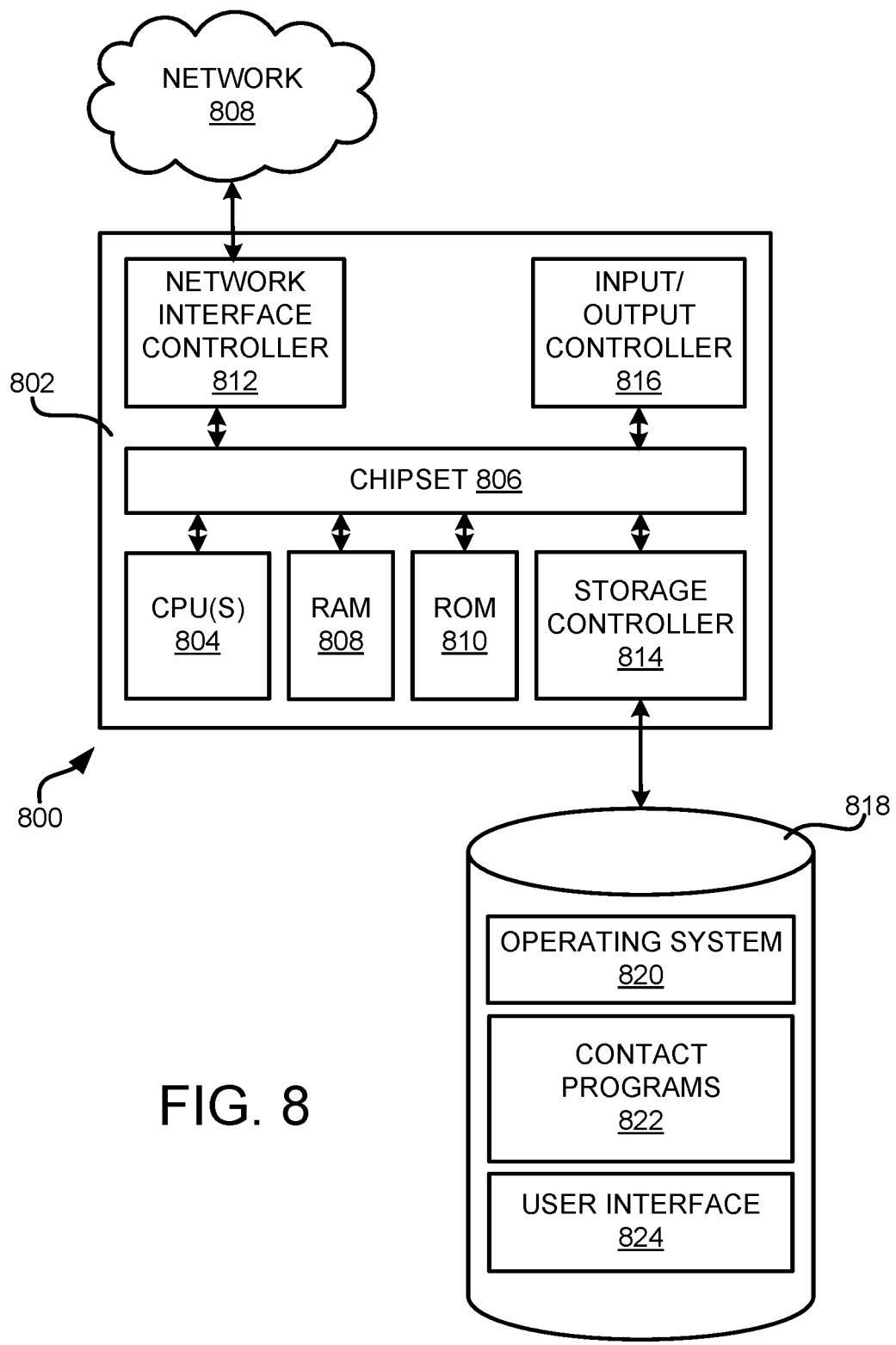
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 808. The chipset 806 can include functionality for providing network connectivity through a NIC 812, such as a gigabit Ethernet adapter. The NIC 812 is capable of connecting the computer 800 to other computing devices over the network 808. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, contact programs 822 for providing functionality associated with the contact system 102, user interface 824, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 818 can store other system or application programs and data utilized by the computer 800.

In examples, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to examples, the computer 800 has access to computer-readable storage media storing computer-executable instructions which, when executed by the computer 800, perform the various processes described above with regard to FIGS. 1-8. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or can utilize an architecture completely different than that shown in FIG. 8.

Based on the foregoing, it should be appreciated that technologies for disambiguating contact information using relationship data have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
one or more processors; and
a non-transitory computer-readable storage medium having instructions stored thereupon which, when executed by the one or more processors, cause the system to perform operations, comprising:
receiving an audio signal that is based on speech uttered by a first user and captured by one or more microphones of a device;
processing the audio signal to identify a voice command to perform an action that utilizes contact information associated with a name included in the voice command;
performing, based at least in part on the voice command, a search of one or more databases that stores contact information and relationship data representing respective relationships between respective users;
identifying, based at least in part on the search and the relationship data, a first candidate contact based on a first relationship between the first user and the first candidate contact, the first relationship determined using the relationship data;
identifying, based at least in part on the search and the relationship data, a second candidate contact based on a second relationship between the first user and the second candidate contact, the second relationship determined using the relationship data;
receiving a selection of a selected contact from at least the first candidate contact and the second candidate contact; and
causing the action to be performed that utilizes contact information associated with the selected contact.

2. The system of claim 1, wherein the operations further comprise generating the relationship data based at least in part on a role of the first user within an enterprise and at least one of a team within the enterprise associated with the first user, a location of the enterprise associated with the first user, or a project of the enterprise associated with the first user.

3. The system of claim 1, wherein the operations further comprise generating a contact graph based at least in part on the relationship data, wherein the contact graph includes individual nodes that represent individual ones of the respective users; and wherein identifying the first candidate contact and identifying the second candidate contact includes performing a search of the contact graph.

4. The system of claim 1, wherein the audio signal comprises a first audio signal, and the identifying the selected contact comprises receiving, from the device, a second audio signal associated with speech that was uttered by the first user and processing the second audio signal to identify the selected contact.

5. The system of claim 1, wherein the operations further comprise:
sending visual information for presentation on a display device, the visual information identifying at least the first candidate contact and the second candidate contact; and
receiving a response to the visual information from the display device, the response indicating the selected contact.

6. The system of claim 1, wherein the identifying the first candidate contact and the identifying the second candidate contact is further based at least in part on organizational chart data that indicates a working relationship between the first user and other users associated with an enterprise.

7. The system of claim 1, wherein the action is one or more of initiating a call to the selected contact or providing the contact information associated with the selected contact to one or more of a computing device associated with the first user or a service of a service provider network.

8. A method, comprising:
receiving an audio signal that is based on speech uttered by a first user and captured by one or more microphones of a device;
processing the audio signal to identify a voice command to perform an action that utilizes contact information associated with a name included in the voice command;
performing, based at least in part on the voice command, a search of one or more databases that stores contact information and relationship data representing respective relationships between respective users;
identifying, based at least in part on the search and the relationship data, a first candidate contact based on a first relationship between the first user and the first candidate contact, the first relationship determined using the relationship data;

identifying, based at least in part on the search and the relationship data, a second candidate contact based on a second relationship between the first user and the second candidate contact, the second relationship determined using the relationship data;

receiving a selection of a selected contact from at least the first candidate contact and the second candidate contact; and causing the action to be performed that utilizes contact information associated with the selected contact.

9. The method of claim 8, further comprising generating the relationship data based at least in part on a role of the first user within an enterprise and at least one of a team within the enterprise associated with the first user, a location of the enterprise associated with the first user, or a project of the enterprise associated with the first user.

10. The method of claim 8, further comprising generating a contact graph based at least in part on the relationship data, wherein the contact graph includes individual nodes that represent individual ones of the respective users; and wherein identifying the first candidate contact and identifying the second candidate contact includes performing a search of the contact graph.

11. The method of claim 8, wherein the audio signal comprises a first audio signal, and the identifying the selected contact comprises receiving, from the device, a second audio signal associated with speech that was uttered by the first user and processing the second audio signal to identify the selected contact.

12. The method of claim 8, further comprising:

sending visual information for presentation on a display device, the visual information identifying at least the first candidate contact and the second candidate contact; and receiving a response to the visual information from the display device, the response indicating the selected contact.

13. The method of claim 8, wherein the identifying the first candidate contact and the identifying the second candidate contact is further based at least in part on organizational chart data that indicates a working relationship between the first user and other users associated with an enterprise.

14. The method of claim 8, wherein the action is one or more of initiating a call to the selected contact or providing the contact information associated with the selected contact to one or more of a computing device associated with the first user or a service of a service provider network.

15. A system, comprising:

one or more processors; and a non-transitory computer-readable storage medium having instructions stored thereupon which, when executed by the one or more processors, cause the system to perform operations, comprising:

receiving an audio signal that is based on speech uttered by a first user and captured by one or more microphones of a device;

processing the audio signal to identify a voice command to perform an action that utilizes contact information associated with a name included in the voice command;

performing, based at least in part on the voice command, a search of one or more databases that stores contact information and relationship data representing respective relationships between respective users;

identifying, based at least in part on the search and the relationship data, a first candidate contact based on a first relationship between the first user and the first candidate contact, the first relationship determined using the relationship data;

identifying, based at least in part on the search and the relationship data, a second candidate contact based on a second relationship between the first user and the second candidate contact, the second relationship determined using the relationship data;

receiving a selection of a selected contact from at least the first candidate contact and the second candidate contact; and providing the selected contact to one or more of an application or a service for an action to be performed that utilizes contact information associated with the selected contact.

16. The system of claim 15, wherein the operations further comprise generating the relationship data based at least in part on a role of the first user within an enterprise and at least one of a team within the enterprise associated with the first user, a location of the enterprise associated with the first user, or a project of the enterprise associated with the first user.

17. The system of claim 15, wherein the operations further comprise generating a contact graph based at least in part on the relationship data, wherein the contact graph includes individual nodes that represent individual ones of the respective users; and wherein identifying the first candidate contact and identifying the second candidate contact includes performing a search of the contact graph.

18. The system of claim 15, wherein the audio signal comprises a first audio signal, and the identifying the selected contact comprises receiving, from the device, a second audio signal associated with speech that was uttered by the first user and processing the second audio signal to identify the selected contact.

19. The system of claim 15, wherein the operations further comprise:

sending visual information for presentation on a display device, the visual information identifying at least the first candidate contact and the second candidate contact; and receiving a response to the visual information from the display device, the response indicating the selected contact.

20. The system of claim 15, wherein the identifying the first candidate contact and the identifying the second candidate contact is further based at least in part on organizational chart data that indicates a working relationship between the first user and other users associated with an enterprise.

* * * * *